US008086595B2

(12) United States Patent
Ruml

(10) Patent No.: US 8,086,595 B2
(45) Date of Patent: Dec. 27, 2011

(54) SYSTEMS AND METHODS FOR SOLVING MULTIPLE INTERACTING STATE-SPACE SEARCH PROBLEMS

(75) Inventor: Wheeler Ruml, Durham, NH (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 399 days.

(21) Appl. No.: 11/949,288

(22) Filed: Dec. 3, 2007

(65) Prior Publication Data

US 2009/0144261 A1 Jun. 4, 2009

(51) Int. Cl.
*G06F 7/00* (2006.01)

(52) U.S. Cl. ........... 707/713; 707/765; 715/705; 706/45

(58) Field of Classification Search ........... 707/999.003, 707/999.005, 713, 765; 715/705; 706/45
See application file for complete search history.

(56) References Cited

U.S. PATENT DOCUMENTS 6,546,300 B1 4/2003 Fukuda et al.
6,591,153 B2 7/2003 Crampton et al.
6,606,527 B2 8/2003 de Andrade, Jr. et al.
6,606,529 B1 8/2003 Crowder, Jr. et al.
6,711,562 B1 * 3/2004 Ross et al. .................... 707/797
6,807,546 B2 * 10/2004 Young-Lai ............. 707/999.102
6,898,475 B1 5/2005 Ruml et al.
6,959,165 B2 10/2005 Mandel et al.
2001/0049688 A1 * 12/2001 Fratkina et al. ............ 707/104.1
2002/0183987 A1 * 12/2002 Chiang ............................. 703/2
2005/0278050 A1 12/2005 Ruml et al.
2005/0278303 A1 * 12/2005 Ruml et al. ....................... 707/3
2006/0026276 A1 * 2/2006 Kroger et al. ................. 709/223
2006/0132815 A1 6/2006 Lofthus et al.
2006/0227350 A1 10/2006 Crawford et al.
2006/0230201 A1 10/2006 Fromherz et al.
2006/0230403 A1 10/2006 Crawford et al.
2006/0235547 A1 10/2006 Hindi et al.
2007/0011123 A1 * 1/2007 Ruml et al. ..................... 706/45

OTHER PUBLICATIONS

U.S. Appl. No. 11/122,420, filed May 5, 2005, Richards.
U.S. Appl. No. 11/170,845, filed Jun. 30, 2005, Sampath et al.
U.S. Appl. No. 10/924,458, filed Aug. 23, 2004, Lofthus et al.
U.S. Appl. No. 11/136,959, filed May 25, 2005, German et al.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.

* cited by examiner

*Primary Examiner* — Shew-Fen Lin
*Assistant Examiner* — Jieying Tang
(74) *Attorney, Agent, or Firm* — Fay Sharpe LLP

(57) ABSTRACT

A combinatorial search method and system is implemented in a computer control system for utilizing state-space planning of operations for multi-step production processes. The planner considers various possible combinations of actions, searching for one that correctly transforms the initial state of the object (or commodity) into the specified desired final state, where each combination of actions the planner considers is called a search node. Each node contains a plan representing a series of actions of a plurality of machines on a single object and also containing the predicted state of the object with those actions applied either forward or backward. The state of the object consists of the set of attributes of the object. The method and system include multiple individual state-space search operations having a plurality of nodes, at least some of the nodes include children, and the children of the nodes represent potential solutions to existing problems to be solved, and the multiple state-space search operations are linked into a single search tree.

14 Claims, 3 Drawing Sheets

SYSTEMS AND METHODS FOR SOLVING MULTIPLE INTERACTING STATE-SPACE SEARCH PROBLEMS

BACKGROUND

This disclosure relates generally to methods and systems for production/manufacturing planning and scheduling. More specifically the disclosure relates to the planning of operations for manufacturing or production tasks by solving multiple interacting state-space search problems.

Production/Manufacturing plants or other environments conventionally require the planning and scheduling of a series of jobs. Because execution of plans requires the use of physical plant resources, planning for later jobs must take into account the resource commitments in plans already released for production. For example, if part 1 is scheduled to use machine 2 for 15 seconds starting at 4:00:00 pm, the plan for part 2 cannot use machine 2 from 4:00:00 to 4:00:15 pm. While production planning and scheduling may be simple for systems that manufacture many identical jobs in an assembly-line fashion, or factories that produce a very small number of custom jobs over a long period of time, it can be extremely difficult in situations involving high-speed custom made-to-order manufacturing, in which different objects may require different processing and the production plan for an object must be created very quickly.

A typical manufacturing plant may be represented as a network of transports linking multiple machines, as shown in FIG. 1. A plant may have anywhere from a few to a several hundred machines and transports. Unfinished blocks of raw material may enter the plant from multiple sources and completed jobs can exit at multiple destinations. In the simplified schematic of FIG. 1, sources 1 and 2 provide materials to Machine 1 and Machine 2, which interface with Machine 3 and Machine 4 as well as Destinations 1 and 2. Transports between sources, machines, and destinations take a known time to convey jobs. Each machine has a limited number of discrete actions it can perform, each of which has a known duration and transforms its input in a known deterministic way.

From a planning perspective, jobs can move through the plant as illustrated in FIG. 2. A job request specifies a desired final configuration, which may be achievable by several different sequences of actions. For example, in FIG. 2 material may be procured from source S1 to be received and processed by machine M1 utilizing either a first or second operation Act1 or Act2. At the completion of either Act1 or Act2, materials may be sent to destination D1, to machine M3, or to machine M2 for further processing. The plant might operate at high speed, with multiple job requests arriving per second, possibly for many hours. Clearly, a fast, automated procedure is necessary to coordinate production, and one that optimizes the throughput of the plant would be advantageous.

The optimal plan for a job depends not only on the job request, but also on the resource commitments present in previously-planned jobs. Most existing approaches to this problem require the enumeration of all possible plans at machine start-up, with retrieval of a suitable plan for each job request and then scheduling of the necessary actions. However, the large number of potential plans in more complex plants makes an on-line planning system desirable. Furthermore, it may not be possible to pre-compute optimal plans because the plan that optimizes plant throughput will depend on the other jobs being processing in the plant at the same time.

The disclosure in U.S. patent application US 2005/0278303 A1 to Ruml et al. is directed to an on-line planning system. In the Ruml et al. application, the plan represents the actions of multiple machines on a single object and the state in each node represents only the state of the object. In contrast with previous work, the machines are likely to be already in operation processing previous jobs during the planning for a new job, and the world consists of many objects being manipulated simultaneously.

In some instances an on-line planning system, as well as other planning systems which do not provide on-line planning, may benefit by considering individual interacting problems of the overall problem as linked problems.

CROSS REFERENCE TO RELATED PATENTS AND APPLICATIONS

The following applications, the disclosures of each being totally incorporated herein by reference are mentioned:

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 11/069,020, filed Feb. 28, 2004, entitled "PRINTING SYSTEMS," by Robert M. Lofthus, et al.;

U.S. application Ser. No. 11/102,899, filed Apr. 8, 2005, entitled "SYNCHRONIZATION IN A DISTRIBUTED SYSTEM," by Lara S. Crawford, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,332, filed Apr. 8, 2005, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/170,845, filed Jun. 30, 2005, entitled "HIGH AVAILABILITY PRINTING SYSTEMS," by Meera Sampath, et al.;

U.S. Application Publication No. 2005/0278050 A1, entitled "EXCEPTION HANDLING IN MANUFACTUR- ING SYSTEMS COMBINING ON-LINE PLANNING AND PREDETERMINED RULES," by Ruml, et al.;

U.S. Pat. No. 6,898,475 B1, entitled "SYSTEM AND METHOD UTILIZING TEMPORAL CONSTRAINTS TO COORDINATE MULTIPLE PLANNING SESSIONS," by Ruml, et al.; and U.S. Application Publication No. 2005/0278303 A1, entitled "SYSTEM AND METHOD FOR PRODUCTION PLANNING UTILIZING ON-LINE STATE-SPACE PLANNING", by Ruml, et al.

INCORPORATION BY REFERENCE

The following U.S. patents and publications are fully incorporated herein by reference: U.S. Pat. No. 6,546,300 ("Production/Manufacturing Planning System"); U.S. Pat. No. 6,591,153 ("System and Methods for Scheduling Manufacturing Resources"); U.S. Pat. No. 6,606,527 ("Methods and Systems for Planning Operations in Manufacturing Plants"); U.S. Pat. No. 6,606,529 ("Complex Scheduling Method and Device"); U.S. Publication No. 2005/0278303 A1 ("System And Method For Production Planning Utilizing On-Line State-Space Planning"); U.S. Publication No. 2005/0278050 A1 ("Exception Handling In Manufacturing Systems Combining On-Line Planning And Predetermined Rules"); and U.S. Pat. No. 6,898,475 B1 ("System And Method Utilizing Temporal Constraints To Coordinate Multiple Planning Sessions").

BRIEF DESCRIPTION

A combinatorial search method and system is implemented in a computer control system for utilizing state-space planning of operations for multi-step production processes. The planner considers various possible combinations of actions, searching for one that correctly transforms the initial state of the object (or commodity) into the specified desired final state, where each combination of actions the planner considers is called a search node. Each node contains a plan representing a series of actions of a plurality of machines on a single object and also containing the predicted state of the object with those actions applied either forward or backward. The state of the object consists of the set of attributes of the object. The method and system include multiple individual state-space search operations having a plurality of nodes, at least some of the nodes include children, and the children of the nodes represent potential solutions to existing problems to be solved, and the multiple state-space search operations are linked into a single search tree.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
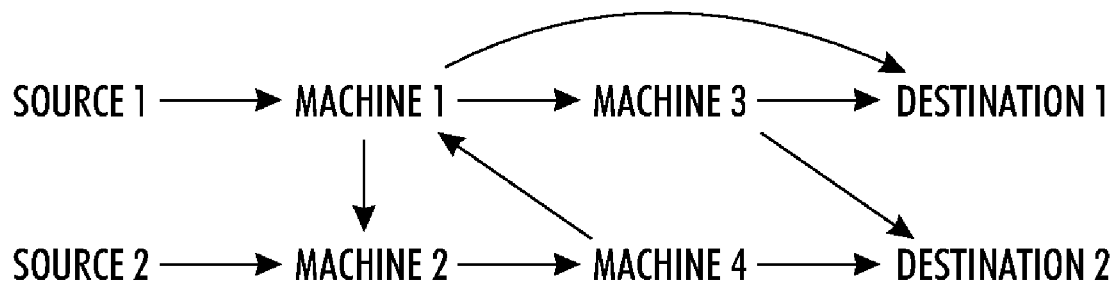
FIG. 1 is a schematic diagram of an example manufacturing plant or other environment.
Figure 2:
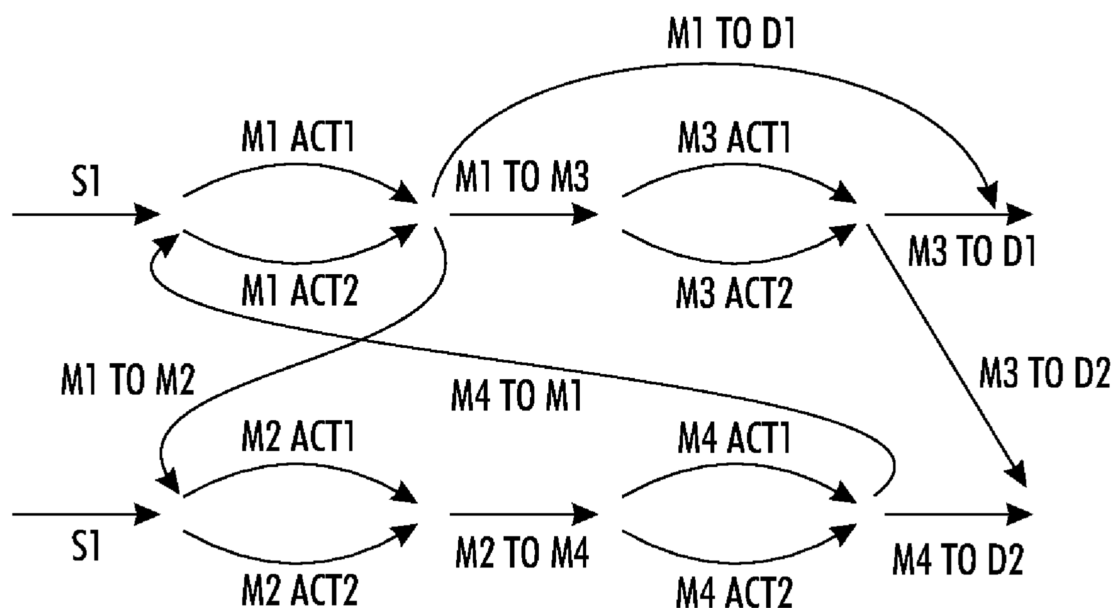
FIG. 2 is a schematic diagram of possible job flow within the manufacturing plant or other environment of FIG. 1.

Disclosed are methods and systems that perform state-space planning and scheduling for a plurality of interacting state-space search problems. The systems and methods described may be accomplished by both generating plans on-line, as well as in off-line environments. In the on-line situation, rather than pre-computing plans before production begins, plans are constructed as needed. The methods utilize a combinatorial search procedure to generate possible plans and choose from among them the best one which will result in the desired object (or commodity) being produced by the plant (or other manufacturing environment). The plant or environment is represented by the set of its capabilities, with each capability being a discrete action that a machine can perform on an object in production. For the purposes of the present discussion, actions are modeled as transformations of logical attributes of an object (e.g. location, surface color, shape, etc.), with all actions modeled as changing the attributes of an object. The planning process identifies, for a given job request, a sequence of actions that transforms the initial state of the object to a desired final configuration.

The systems and methods apply to control software used for multi-step production processes such as manufacturing, printing, or assembly and provide for the handling of complex operations over complex paths to provide flexible routing, optimal productivity, and optimal load balancing. In the following description numerous specific details are set forth in order to provide a thorough understanding of the system and method. It would be apparent, however, to one skilled in the art to practice the system and method without such specific details. In other instances, specific implementation details have not been shown in detail in order not to unnecessarily obscure the present invention.

Various computing environments may incorporate generative state-space planning functionality. The following discussion is intended to provide a brief, general description of suitable computing environments in which the concurrent planning and scheduling methods and systems may be implemented. Although not required, the methods and systems will be described in the general context of computer-executable instructions, such as program modules, being executed by a single computer. Generally, program modules include routines, programs, objects, components, data structures, etc. that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The methods and systems may also be practiced in distributed computing environments where tasks are performed by remote processing devices that are connected through a communications network. In a distributed computing environment, program modules may be located in both local and remote memory storage devices.

Although the methods and systems described herein are not limited to embedded applications, the following discussion will pertain to embedded systems for purposes of example only. One skilled in the art will appreciate that the planning and scheduling methods and systems are useful for many complex control problems, generic software solutions to a wide variety of programming problems, flexible programs that separate the model from its solution, and wherever formulation as constraint problems is natural for expression of domain knowledge. Additionally, it may be practiced in a multitude of computing environments.

The present methods and systems are based on combinatorial search concepts. That is to say, the planner considers various possible combinations of actions, searching for one that correctly transforms the initial state of the object (e.g., including its attributes such as location) into the specified desired final state of the object. Each combination the planner considers is called a 'node'. Each node contains a series of actions (a plan) and the predicted state of the object after those actions have been applied. The search involves generating, for a given node, all the possible ways of adding a single action to that node's plan. These augmented plans then form new search nodes, which are called 'children' of the original node. For expository purposes, we will illustrate a current method using one particular implementation in which the planner proceeds by searching backwards in time. The combinations are thus generated by starting from a node that contains an empty plan having no actions and also the desired final state of the object. Taking the example of a printing system, the desired final state might involve a sheet of paper being in a particular output tray with a particular image on the front side. The planner then considers all actions whose effects are consistent with that final state of the object. In our printing example, there might be two different transport actions that can result in a sheet being located in the desired output tray. The planner generates new nodes corresponding to these two possibilities. Each node contains a different plan, consisting of the single corresponding action, and a different predicted state of the object, corresponding to the different locations from which the different transport actions can move a sheet to the desired output tray. These new nodes are the children of the initial node.

The planner maintains a list of generated nodes, and iteratively removes a promising node from the list, considers all legal actions that could be prefixed to its plan, and generates the child nodes resulting from those possible actions. In this way, the planner searches backwards through time, considering the possible combinations of actions. Whenever the state of the object in a node corresponds to the initial state, the planner can return the associated plan.

Much academic work has considered state-space planning backward through time. However, most previous work has been concerned with cases in which a single machine or agent is acting on multiple objects. The plan represents the actions of this single machine in its environment and the state in each node represents the state of the world. Furthermore, such planning takes place before the agent begins to act.

The disclosure in U.S. patent application US 2005/0278303 A1 to Ruml et al. teaches the novel specialization and application of these general concepts to the problem of manufacturing and production operations. In that disclosure, the plan represents the actions of multiple machines on a single object and the state in each node represents only the state of the object. In contrast with previous work, the machines are likely to be already in operation processing previous jobs during the planning for a new job, and the world consists of many objects being manipulated simultaneously.

The state in each search node consists of the set of attributes of the object. It may also contain scheduling information, such as times or abstract time points for each action in that node's plan. Additionally, it may contain resource usage information, where a resource is a part of the machine that can be used by only one action at a time. Because each child node modifies the parent node's job state differently or introduces different resource constraints, the state at each search node is unique and it is not necessary to consider the problem of duplicated search effort resulting from reaching the same state by different paths in the tree of search nodes. The domain may be specified as a set of actions written in a progression style, such as the standard style of STRIPS [Richard E. Fikes and Nils J. Nilsson, "STRIPS: A New Approach to the Application of Theorem Proving to Problem Solving," Artificial Intelligence, 2 (1971) 189-208.], in which an input state is transformed into an output state and preconditions declare when an action can be applied.

Alternatively, the domain may be specified in a regression style, i.e., declaring transformations applied backwards. If a domain specification in progression style is used, the use of regression requires modification of the action specifications. When the domain is initially parsed, action specifications are rearranged into new sets of preconditions and effects for use in regression. The new preconditions are the effects of the original action as well as those preconditions that are not touched by the effects. The remaining original preconditions are the effects of the rearranged action.

Turning now more particularly to the concepts of the present application, in any optimization system which uses combinatorial state-space search to find solutions to problems, it is advantageous to find solutions for multiple interacting problems. One way to do this is to solve the first problem, and then solve the second problem while holding fixed the solution to the first. A third problem would then be solved while holding fixed the solutions to the first two, and so on. This is very natural, especially if problems arrive one-by-one in a long stream and don't interact to a high degree. Complex printing systems can use state-space search to find plans for producing each sheet in a print job. For the second sheet, one can search for a plan that is compatible with the plan produced for the first sheet, and so on. However, when solving subsequent problems, sometimes decisions made in solving the previous ones can interfere and force a suboptimal solution or no solution at all. There are therefore some cases where it can be advantageous to try to resolve the first problem to achieve a better solution for the two problems together. This present disclosure addresses this case of solving multiple interacting problems. One example where this is important is in replanning for complex printing systems in which several sheets are already in-flight inside the printer. One might desire to find a plan for each sheet such that all sheets can be routed to a purge tray. Finding the best plan for one sheet is not helpful, however, if it prevents plans from being found for other sheets. The present methods and systems apply to any environment that uses state-space search to solve the individual problems. The processes used in the present application for solving the individual interacting problems are able to return a sequence of different solutions to the individual problems and is interruptible after returning each individual solution.

With more particular attention to the processes, in a state-space search, the space of possible solutions is conceptualized as a large tree of 'nodes'. (Some spaces are actually graphs, but hash tables and other techniques can be used to detect duplicate paths and hence for expository purposes we will limit our discussion to trees.) At the root node, one has an empty solution. Child nodes represent ways of elaborating the solution represented by the parent node. In a planning problem this elaboration is typically adding one step to the plan or planning for an additional increment of time. The other nodes in the tree are initially not stored explicitly at the beginning of search, because typically there are exponentially many of them. Instead, the children of a node are generated when needed. This process is called 'expanding' the node. There are many methods for selection which node to expand next. One method is called best-first search (The well-known A* algorithm and Dikstra's algorithm, are variants of best-first search.). The present invention applies to many methods, although for the purpose of expository concreteness we will refer to best-first search.

At each node, one computes some estimate of the promise of the plan represented by that node. Nodes are expanded in order of decreasing promise (or increasing cost), hence the name 'best-first search'. New child nodes are often inserted into a priority queue data structure to facilitate easy access to the best currently-known node.

The present methods and systems take as a starting point the observation the multiple possible solutions to an individual problem can themselves be seen as different child nodes in a search space. One can imagine a tree in which the root node contains one branch for every possible solution to the first problem, each of these nodes contain a branch for every possible solution to the second problem, and so on. If n interacting problems are being considered, then a solution to all the problems together is represented by a path from the root node down through n levels of the tree. This tree is rather unusual in that it has a fixed number of levels but the number of nodes at branch points can vary depending on the number of solutions to the problem at that level, in the context defined by the particular solutions selected for the previous problems. There might be no solutions at some nodes or, because some problems can have an infinite number of solutions (for instance, the number of routes through a printing system that contains loops) the branching factor might be infinite. This infinite branching factor can be dealt with by generating each child node only when it is needed. Additionally, in some state-space searches it is impossible to determine if any solution will ever be found. To address this issue, an upper bound can be set on the number of nodes that can be generated while trying to solve any individual problem. This bound both permits the method and system to end the attempt to solve a problem when no solution has been found within a predetermined boundary and prevents the method and system from generating an infinite number of solutions to an individual problem.

Figure 3:
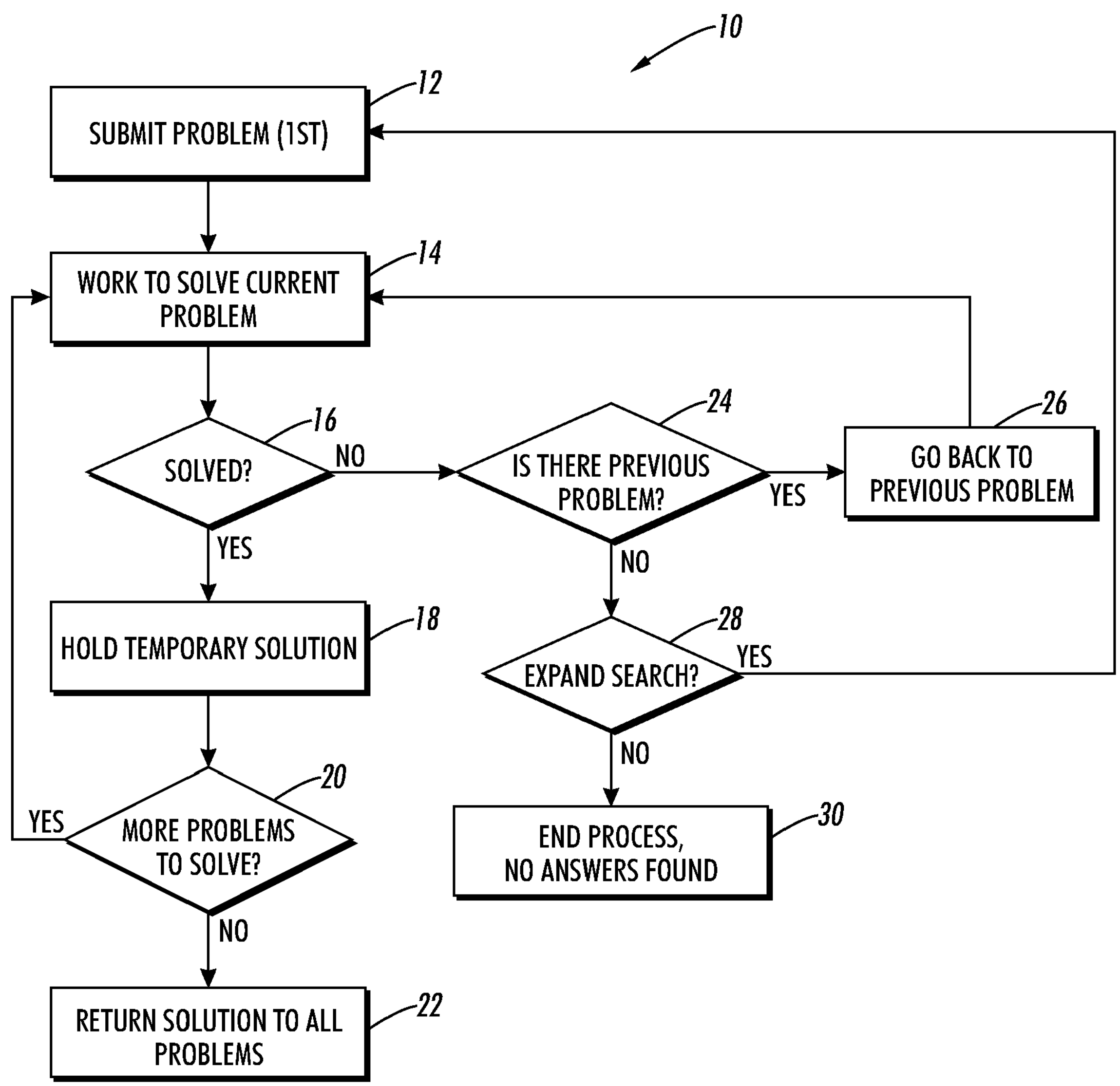
FIG. 3 is a flow diagram detailing an example of a process employing best-first search methodology and backtracking concepts to solve multiple interacting state-space problems for complex parallel systems.

Turning to FIG. 3 depicted is an example of how this search of a space of searches can be undertaken. An effective approach is a depth-first search, which works on a first problem until the first feasible solution is found. Particularly, an individual problem, of a plurality of interacting problems, is provided to the process, step 12, and the process works to solve the current problem, step 14. Once the current problem has been solved, step 16, the process interrupts that search and holds or stores the solution, step 18. The process then determines if more problems exist, step 20, and works to solve the remaining problems (steps 14-20). When solutions to all the problems are found, the process moves from step 20 to step 22 and an overall solution is returned.

Whenever a solution to a problem cannot be found with a certain set of criteria (e.g., within a set upper bound), step 16, the process backtracks to the most recently solved problem (steps 24, 26), and searching for another solution is undertaken, from where the process left off on that problem, step 14. If a new solution is found, step 16, then the process begins afresh trying to solve the next problem from scratch, taking into account the new solution to the previous problem. When no solution can be found, step 16, the process backtracks again, and so on. If it happens that the process backtracks all the way to the solution for the first problem (e.g., root node) and no additional solution can be found within the current bound, step 24, the search space can be expanded (e.g., the bound can be increased), step 28. On the other hand when the answer cannot be found and the search space cannot to be increased, the process moves from step 28 to step 30, terminating any additional searching, and the process ends without returning a solution to the overall problem.

Implementation of the process shown in FIG. 3 provides a depth-first search across the tree of possible solutions to the individual problems.

Figure 4:
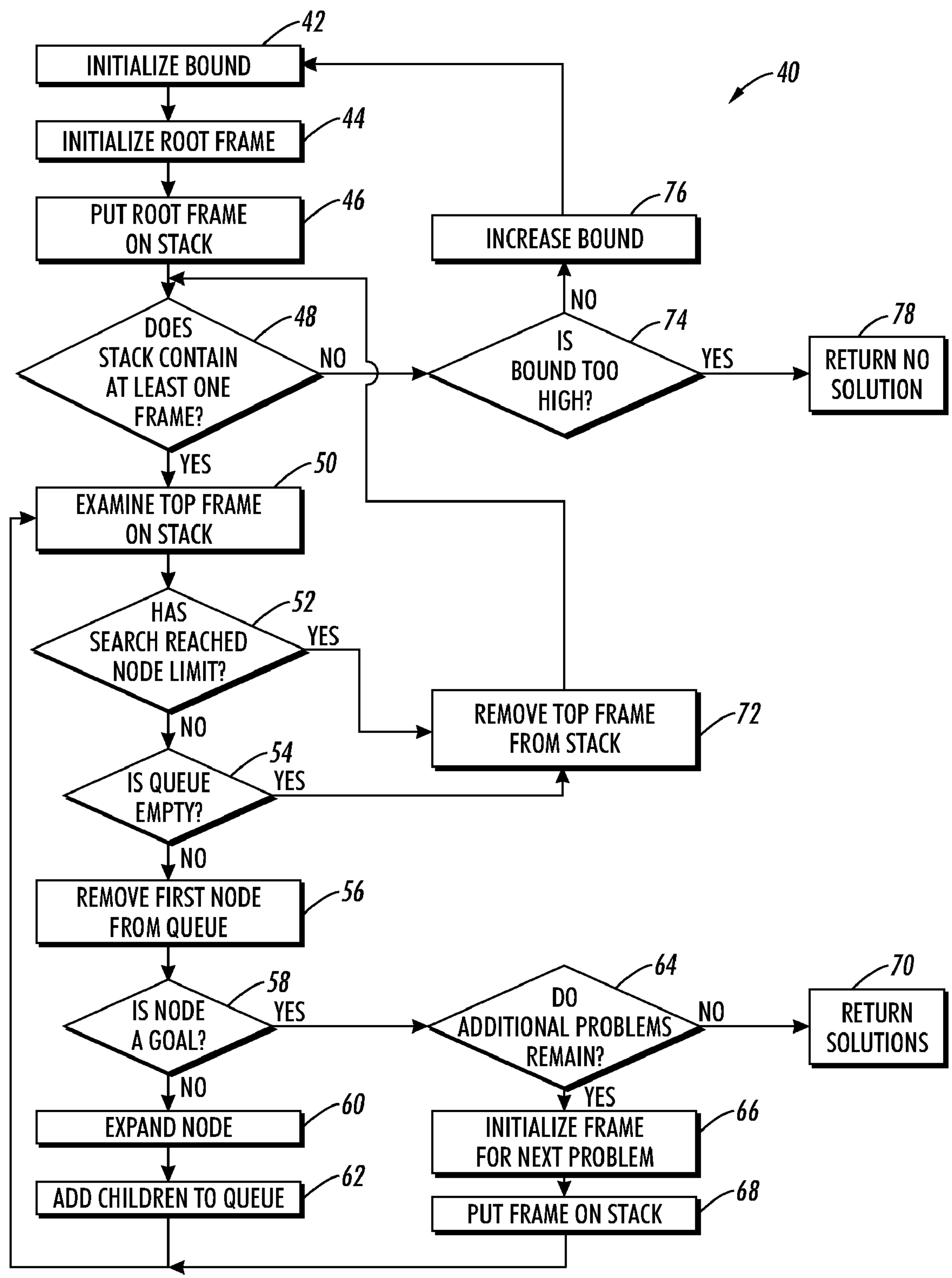
FIG. 4 is a flow diagram setting forth another process employing best-first search methodology and backtracking concepts to solve multiple interacting state-space problems for complex parallel systems.

Turning now to FIG. 4 illustrated is a flowchart 100 setting forth another process flow which uses a first-best search methodology and backtracking concepts to solve multiple interacting state-space problems for complex parallel systems. The described process explicitly shows the use of stack frames to represent the recursive calls to the depth-first search.

Step 42 initializes an upper bound value for searching children nodes of a parent node, and step 44 initializes the root frame. In this discussion, a "frame" represents one on-going plan search for a solution for a specific job. More specifically, the individual search represented by the frame will return, for example, the plan for printing one sheet (e.g., a job) of a multi-sheet document (e.g., a batch). In step 46, the root frame is placed on a stack. This stack is used to store all the on-going searches for the multiple interacting planning problems, with the top-most frame representing the problem currently being worked on. In essence, provisional plans for the sheets are put on hold once they have been provisionally completed, and subsequent plan search frames will be placed on top of them in the stack In one arrangement the stack is configured as a Last-In, First-Out (LIFO) stack.

In step 48, the LIFO stack is interrogated to determine whether a frame is located on the stack. Since the root frame was placed on the stack in step 46, the answer to the interrogation of the stack is positive, and the process moves to step 50. In this step, the process examines the top frame located on the LIFO stack. It is to be appreciated, in this initial pass through the process the top frame on the stack will be the root frame. However, as the process proceeds through multiple iterations, the interrogation of the stack in step 50 may be to frames other than the root frame.

In step 52, the process determines whether a search which solves the "problem" of the frame has been reached. In particular, the question is, have all the nodes that are allowed to be investigated been reviewed. For purposes of the discussion, at this point the answer to that inquiry will be "no", causing the process to move to step 54, where an inquiry is made as to whether or not the best-first queue of search nodes is empty. For purposes of this discussion, it is assumed at this time there are nodes in the queue. The queue is, in this arrangement, sorted to present the nodes in accordance with best scores (i.e., a best-first search methodology). More particularly, a best-first search methodology views a group of potential solutions (e.g. nodes) to a problem, rates or grades the potential solutions, and then places the potential solutions in the queue in a ranking from the potential solution having the highest likelihood of solving the problem to the solution having the lowest likelihood of success.

Thereafter, in step 56, the process removes the first node (i.e., the node with the highest likelihood of solving the existing problem) from the queue. Once the node is removed, the process determines (in step 58), whether the node provides a solution which reaches a desired goal. For example, in the instance of re-planning of paper flow, does the node provide a plan for one of the sheets in a job or document (i.e., sheet 1 or sheet 2 or sheet 3, etc.) to be processed all the way to the finisher of the printer. If the answer to this inquiry in step 58 is "no" (as it will be assumed initially for discussion purposes), the process moves to step 60, where that node is expanded to include all its children nodes. Then in step 62, these new children nodes will be added to the queue previously discussed.

Once the children nodes have been added to the queue, the process loops back to step 50, to examine which frame is the "top frame on the stack." Now when the process investigates the top frame on the stack (which will be the same top frame as before), it will have an augmented queue with additional nodes (i.e. children nodes). Steps 50-62 are repeated to permit the process to solve the problem for a particular sheet in a multi-sheet problem. Thus, steps 50-62 are a search loop for the solution of one problem (e.g., one sheet).

When the process loop (steps 50-62) reaches a state at step 58 that the node having been removed in step 56 is a goal node (e.g., it solves the problem by providing a plan to process sheet 1 to the finisher or output), then the process moves to step 64. At this point, an inquiry is made as to whether any additional problems remain (i.e., are there any remaining sheets which need to be solved). Assuming there are additional unplanned sheets in the job or document being processed, the response will be "yes", and the process moves to step 66 where the system will initialize a frame for the next problem (e.g., the next sheet to be planned). Then in step 68, this frame is placed on the LIFO stack. The process next loops back to step 50, and the same processing previously described in the solving of the first problem is undertaken in steps 50-62. These processes continue for all the sheets of the document until, at step 64, the response to the inquiry of whether additional problems remain is answered in the negative. Then the process moves to step 70 where a total solution is returned. The returned solution will be, in this implementation, in the form of a schedule to the controller to print all sheets in a multi-sheet document. Of course, in other implementations, the returned solution will be a specific production plan or schedule for the particular problem to which it is applied.

With continuing attention to the process flow 40 of FIG. 4, during problem solving in steps 50-62, if the search for a solution has reached a node limit, as inquired of in step 52, the process moves to step 72, and the top frame from the stack is removed. Note that step 72 can also be reached from step 54 if a search exhausts the space of all possible plans without finding a solution. This procedure illustrates the backtracking feature of the chained best-first-search process of the present application. It is to be understood, while the concept of backtracking in a general sense has been discussed by others, it has not been considered in connection with the planning of complex parallel systems with interacting problems as discussed herein. Thus, by incorporating the backtracking concept (starting at step 72), the system and method ensures that additional possible solutions for previous problems are considered (if the node bound allows) so that if such other possible solutions permit a solution to all of the multiple interacting problems, this combination will eventually be discovered. The process removes the frame of the unsolved problem (step 72), checks if there are previous frames in the stack (step 48), and assuming there is at least one previous frame, moves back through steps 50-62 for the previous job, to determine a different solution which will not prevent a solution for the subsequent jobs.

Similarly, in step 54, if it is determined in step 52 the search has not yet reached the node limit, but the queue is empty (i.e., all nodes in the queue have been searched, but no solution found), the process moves to step 72 and removes that frame from the stack. If there is an additional frame in the stack, the process will again search for a solution which will not inhibit the remaining solutions to the remaining frames.

By this process, the chained best-first search concepts are implemented. Once the backtracking and forward searching has been completed, and all the frames have been investigated, the process moves to step 70 and returns the final solution.

However, if at step 48 it is determined the stack does not contain at least one frame, the process moves to step 74 to determine whether the bound is too high (i.e., the search space is growing too large). This means the search space is not to be increased any larger than is now set by initialization of the bound in step 42. This process is intended to insure that an infinite searching situation is avoided. Particularly, it is known that bound/branch (state-space) searches have the capacity to result in virtually infinite loop searching without ever resulting in a solution.

If when the bound is investigated it is determined that it is not too high, and it is possible to increase the bound (e.g., a user is willing to wait a longer time period to obtain results), the initialization value in step 42 is increased. However, if it is determined in step 74 the bound cannot be increased (i.e., the user is not willing to expend more computational time and/or effort in obtaining an answer), then the process moves to step 78 and the search process shuts down without returning a final solution.

FIGS. 3 and 4 illustrate examples of flow operations to solve multiple interacting state-space search problems for complex parallel systems by linking the space-state searches. The flows of FIGS. 3 and 4 form a new search base in which each branching node represents ways to solve one of a number of sub-problems. One application of the proposed methods and systems is in re-planning in-flight sheets for a complicated printing system such as a TIPP printer from Xerox Corporation. In this implementation, the solutions shown in FIGS. 3 and 4 are applied in an exception handling situation, where, for example, papers are in process within the printing system when some error or other complication arises requiring re-planning of a previously configured plan. However, it is to be appreciated the methods and systems described herein may be used in any other implementation which would benefit from a system or method which solves multiple interacting state-space search problems.

It is noted that one could present the described overall problem as one large state-space search problem rather than multiple linked problems. However, in some cases (such as TIPP re-planning) it is more efficient to construct a solver for the individual problems and link them together than to construct an entirely new solver for a single 'all-in-one' problem. The individual problems are more similar to nominal-case planning and can reuse some of the same code and data structures (including the heuristic evaluation function used to guide the search). Also, while the individual job searches of the present application have been described primarily and generally as being solved via the use of best-first search methodology, and the A* algorithm and Dikstra's algorithm have been mentioned as specific examples, the individual problems may also be solved using other heuristic concepts.

It will be appreciated various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An on-line combinatorial search method implemented in a computer control system for utilizing a state-space planner for planning of operations for multi-step production processes in a manufacturing system having a plurality of machines, wherein the state-space planner considers possible combinations of actions, searching for one that correctly transforms an initial state of an object of a plurality of objects into a specified desired final state, wherein each of the combination of actions the state-space planner considers is called a search node, with each search node containing a series of actions to be performed on the object of the plurality of objects, the method comprising:

performing, while the manufacturing system is on-line, multiple state-space search operations in a search space having a plurality of the search nodes to find individual solutions to multiple interacting individual problems, wherein at least some of the search nodes include children nodes, and actions of the search nodes and children nodes represent potential solutions to the existing interacting individual problems to be solved, and wherein the performed multiple state-space search operations include:

searching for a solution to a first individual problem, from among the plurality of existing individual problems required to be solved for operation of the manufacturing system, wherein the solution to the first individual problem results in a plan for the first individual problem;

suspending searching for the solution to the first individual problem when the solution is found;

storing the solution to the first individual problem when the solution is found;

searching for a solution to a second individual problem, from among the plurality of individual problems, wherein the solution to the second individual problem results in a plan for the second individual problem and wherein the solution for the second individual problem is consistent with the solution of the first individual problem such that the solution to the first individual problem and the solution to the second individual problem do not interfere with each other;

determining the solution to the second individual problem cannot be obtained;

backtracking to the first individual problem;

discarding the entire solution to the first individual problem;

searching for an alternative solution to the first individual problem;

finding the alternative solution to the first individual problem;

re-searching for the second individual problem;

repeating the searching, suspending, storing, determining, backtracking, discarding, finding, and re-searching steps for the remaining problems;

returning a final solution for all the individual problems; and linking, while the manufacturing system is on-line, the solutions found by the multiple state-space search operations for the solved multiple individual problems together as an overall solution.

2. The method of claim 1, wherein the linked solutions form a search tree which is traversed using a depth-first search.

3. The method of claim 1, wherein the individual problems are solved using a best-first search.

4. The method of claim 1, wherein the individual problems are solved using a heuristic search.

5. The method of claim 4, wherein the heuristic search is one of A* search algorithm or Dikstra's algorithm.

6. The method of claim 1, wherein the objects are sheets in a printing system, the problems are individual problems related to the printing system and the final solution is found while the sheets of a document to be printed are in-flight within the printing system.

7. The method according to claim 1 wherein the individual problems being solved are in an inherent order, the search operations only looking to an immediate subsequent individual problem when a complete solution for a preceding individual problem is completely found.

8. The method according to claim 7 wherein the search operations for a solution of the individual problem takes into account solutions to previous individual ordered problems wherein a new solution needs to be consistent with the previous ordered problems.

9. The method according to claim 1 further including backtracking to a previously solved individual problem, canceling the whole solution of the previous individual problem and searching for a new solution of the previous individual problem.

10. The method according to claim 1 wherein a depth-first-search is applied to an overall search tree consisting of all individual solutions to the individual problems.

11. The method according to claim 10 wherein the overall search tree has a fixed number of levels, where the number of nodes at branch points can vary depending on the number of solutions to the problems at that level, in the context defined by the particular solutions selected for previous problems.

12. The method according to claim 1 further including constructing a solver for each independent problem and linking all the solvers of the individual problems together to generate a plan for the overall problem.

13. A system implemented in a computer control system for performing an on-line combinatorial search for utilizing a state-space planner for planning of operations for multi-step production processes in a manufacturing system having a plurality of machines, wherein the planner considers various possible combinations of actions, searching for one that correctly transforms an initial state of an object of a plurality of objects into a specified desired final state, wherein each combination of actions the planner considers is called a search node, with each search node containing a plan representing a series of actions on the object of the plurality of objects, the system comprising:

means for performing multiple on-line state-space search operations having a plurality of search nodes to find solutions to multiple interacting individual problems, wherein at least some of the search nodes include children nodes, and the actions of the search nodes and children nodes represent potential solutions to the existing interacting individual problems to be solved, wherein the performed multiple state-space search operations include:

means for searching for a solution to a first individual problem, from among the plurality of existing individual problems required to be solved for operation of the manufacturing system, wherein the solution to the first individual problem results in a plan for the first individual problem;

means for suspending searching for the solution to the first individual problem when the solution is found;

means for storing the solution to the first individual problem when the solution is found;

means for searching for a solution to a second individual problem, from among the plurality of individual problems, wherein the solution to the second individual problem results in a plan for the second individual problem and wherein the solution for the second individual problem is consistent with the solution of the first individual problem such that the solution to the first individual problem and the solution to the second individual problem do not interfere with each other;

means for determining the solution to the second individual problem cannot be obtained;

means for backtracking to the first individual problem;

means for discarding the entire solution to the first individual problem;

means for searching for an alternative solution to the first individual problem;

means for finding the alternative solution to the first individual problem;

means for re-searching for the second individual problem;

means for repeating the searching, suspending, storing, determining, backtracking, discarding, finding and re-searching steps for the remaining problems;

means for returning a final solution for all the individual problems; and means for linking the solutions found by the multiple state-space search operations together as an overall solution, wherein each potential solution to each individual problem is a complete solution for one of the plurality of objects.

14. An article of manufacture comprising a computer usable medium having non-transitory computer readable program code embodied in said medium which, when said program code is executed by said computer causes said computer to perform methods steps for of a combinatorial search method implemented in a computer control system for utilizing a state-space planner for planning of operations for multi-step production processes in a manufacturing system having a plurality of machines, wherein the planner considers various possible combinations of actions, searching for one that correctly transforms an initial state of an object of a plurality of objects into a specified desired final state, wherein each combination of actions the planner considers is called a search node, with each search node containing a plan representing a series of actions on the object of the plurality of objects, the method comprising:

performing multiple state-space search operations having a plurality of search nodes, to find solutions to multiple interacting individual problems wherein at least some of the search nodes include children nodes, and the actions of the search nodes and children nodes represent potential solutions to the existing interacting individual problems to be solved, wherein the performed multiple state-space search operations include:

searching for a solution to a first individual problem, from among the plurality of existing individual problems required to be solved for operation of the manufacturing system, wherein the solution to the first individual problem results in a plan for the first individual problem;

suspending searching for the solution to the first individual problem when the solution is found;

holding or storing the solution to the first individual problem when the solution is found;

searching for a solution to a second individual problem, from among the plurality of individual problems, wherein the solution to the second individual problem results in a plan for the second individual problem and wherein the solution for the second individual problem is consistent with the solution of the first individual problem such that the solution to the first individual problem and the solution to the second individual problem do not interfere with each other;

determining the solution to the second individual problem cannot be obtained;

backtracking to the first individual problem;

discarding the entire solution to the first individual problem;

searching for an alternative solution to the first individual problem;

finding the alternative solution to the first individual problem;

re-searching for the second individual problem;

repeating the searching, suspending, storing, determining, backtracking, finding, and re-searching steps for the remaining problems;

returning a final solution for all the individual problems; and linking the solutions found by the multiple state-space search operations together as an overall solution, wherein each potential solution to each individual problem is a complete solution for one of the plurality of objects.

* * * * *